United States Patent [19]

Iggulden et al.

[11] Patent Number: 4,918,723
[45] Date of Patent: Apr. 17, 1990

[54] KEYBOARD TO FACSIMILE MACHINE TRANSMISSION SYSTEM

[75] Inventors: Jerry R. Iggulden, 21600 Cleardale St., Newhall, Calif. 91321; Donald A. Streck, 832 Country Dr., Ojai, Calif. 93023

[73] Assignees: Jerry R. Iggulden, Santa Clarita; Donald A. Streck, Ojai, both of Calif.; a part interest

[21] Appl. No.: 254,925

[22] Filed: Oct. 7, 1988

[51] Int. Cl.$^4$ .......................................... H04M 11/00
[52] U.S. Cl. ....................... 379/100; 379/96; 379/91; 358/402; 358/438; 358/452
[58] Field of Search ................ 379/100, 91, 96–98; 358/257, 263, 402, 434, 435, 438, 442, 452, 462; 382/61

[56] References Cited

U.S. PATENT DOCUMENTS 4,471,165 9/1984 DeFino et al. .................... 379/96
4,652,933 3/1987 Koshiishi ........................ 358/257
4,672,459 6/1987 Kudo ............................ 358/257

FOREIGN PATENT DOCUMENTS

0023665 1/1987 Japan ............................ 379/100

Primary Examiner—Jin F. Ng
Assistant Examiner—Wing F. Chan
Attorney, Agent, or Firm—Donald A. Streck

[57] ABSTRACT

A keyboard to facsimile transmission device allowing the direct imputting of a sequence of identifying signals representing alpha-numeric characters and delimiters comprising a message to be transmitted to a facsimile machine for printing thereby. The messages are input to a keyboard employing an LCD display panel in a text editing mode. The messages are digitized from stored font definitions and output on a line-by-line basis in the form of a pseudo page including spacing areas of non-characters inserted by the logic according to a pre-established page definition. Stored forms character sequences can be intermeshed with inputs from the keyboard to allow the user to operate in a self-prompting mode. A digitized signature or small hand drawing can be inserted with the text for transmitting orders, checks, credit vouchers, or the like, requiring a verifying signature. The font definitions include pixel replication for reduced memory and time requirements. Both military and commercial applications are described.

41 Claims, 8 Drawing Sheets

KEYBOARD TO FACSIMILE MACHINE TRANSMISSION SYSTEM

BACKGROUND OF THE INVENTION

The present invention relates to facsimile transmission systems and, more particularly, to a keyboard to facsimile transmission device comprising, input means for inputting a sequence of identifying signals representing alpha-numeric characters and delimiters comprising a message to be transmitted to a facsimile machine for printing thereby; modem means for establishing a telephonic connection to the facsimile machine; and, transmit means for sequentially retrieving the stored signals, for using the signals to formulate lines of facsimile compatible data representing the alpha-numeric characters associated with the signals; and for transmitting the lines of facsimile compatible data to the facsimile machine.

Figures 1, 2, 3, 4:
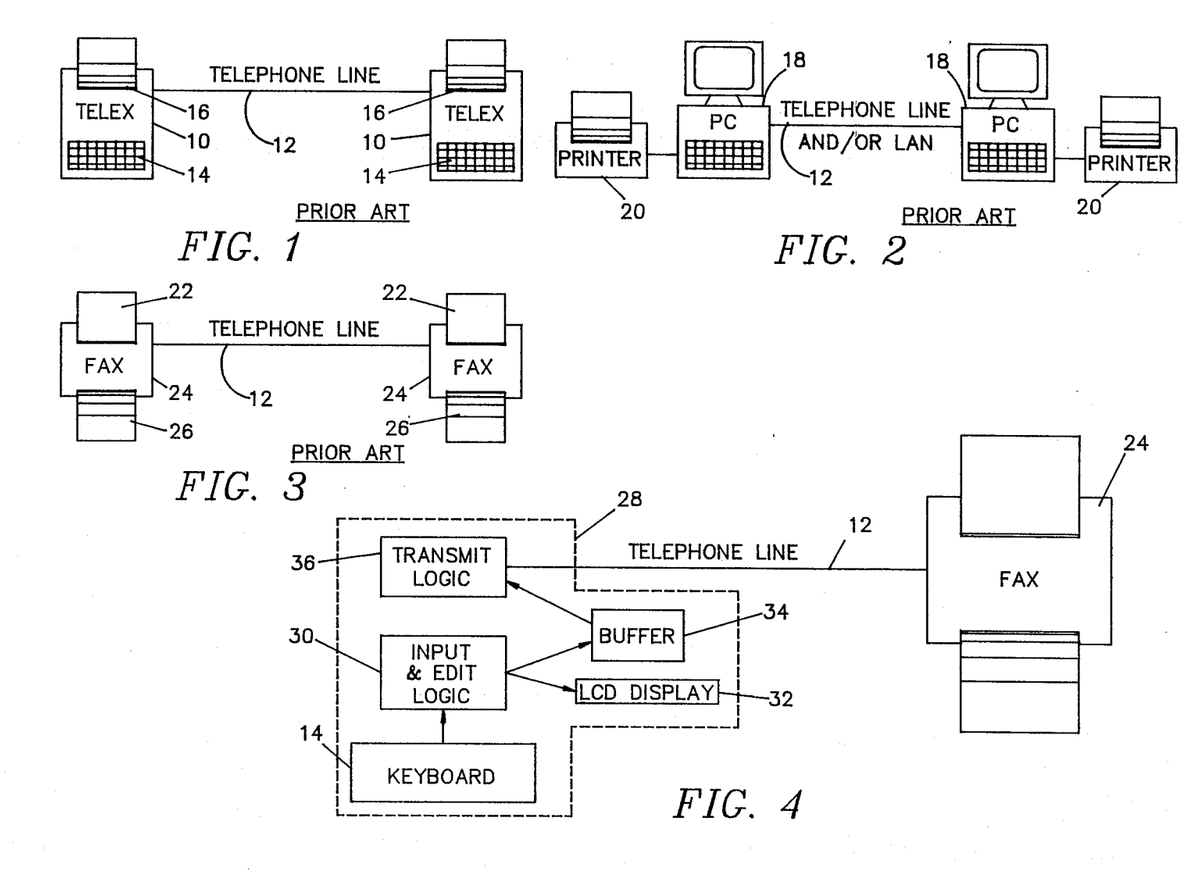
FIG. 1 is a simplified drawing of a prior art, bi-directional, telex to telex transmission system.
FIG. 2 is a simplified drawing of a prior art, bi-directional, personal computer to personal computer transmission system.
FIG. 3 is a simplified drawing of a prior art, bi-directional, facsimile to facsimile transmission system.
FIG. 4 is a similified functional block diagram of the basic keyboard to facsimile transmission system of the present invention.

The transmission of alpha-numeric data from point to point over the telephone lines (including wires, fiber optic cables, microwave, and satellites) is a technology which has grown rapidly over the past few years for commercial, personal, and military applications alike. Devices and modes of data transfer not even contemplated ten years ago are common place today. For example, ten years ago telex, as depicted in FIG. 1, was the common method for the rapid, hard-copy transmission of data. Before that, businesses that wanted to send messages had to employ radio-grams, cable-grams, and tele-grams through outside organizations such as Western Union. With the advent of telex, an office having a telex machine 10 connected to the telephone line 12 could send a written message to any other such device in the world. Each telex 10 had an associated telephone number (just like a telephone). When the receiver's number was dialed, the receiver answered the call and created a telephonic connection between the two telex machines. Anything typed in on the keyboard 14 of one telex would be printed on the printing paper 16 of the sending device and, simultaneously, on the printing paper 16 of the receiving device. While bi-directional "conversations" could be held through typed inputs, the more common use was the uni-directional sending of a pre-typed message from a paper tape (not shown) in order to minimize the connect time for the telephone call.

The original telex machines were large, noisy, and cumbersome to use because of their completely mechanical construction. With the advent of micro-computers, telex machines were upgraded to permit editing of the materials and display of transmitted messages on a CRT display. Before these new embodiments could really take off by way of consumer acceptance, however, two new areas of electronic technology emerged which caused the virtual death knell of telex as a popular and common way of communications. The first was the introduction of low-cost personal computers (PCs) with an associated modem as depicted in FIG. 2. With such apparatus, the telex became redundant. Unlike a telex machine which merely occupied space when not being used for its single purpose, the PCs 18 could provide word processing and other support functions for the business as a primary function. On the rare occasion when a message had to be sent, the message could be input and edited and then sent to the other PC 10 over the telephone line 12 (or a local area network) to be printed out on the PC's printer 20.

The introduction of facsimile (FAX) transmission on a workable basis was the instant replacement for telex. As depicted in FIG. 3, any document 22 can be inserted into the FAX machine 24 where it is scanned and digitized, transmitted over the telephone line 12, and printed out at 26 by the receiving FAX machine 24. Facsimile transmission was available for some time without general acceptance because it was so slow. The document was placed on a rotating drum and slowly scanned in early so-call Group I devices. With Group II and later facsimile transmission, however, the document is placed into a feed hopper and scanned horizontally a line at a time in the same manner as contemporary photocopy devices and at much faster speeds than the old Group I machines. Thus, facsimile transmission has gained rapid acceptance as a useful and practical replacement for telex. The machines are desktop devices occupying little space when not in use. Their price is rapidly dropping and they can digitize and transmit anything that they can "see" including typed text, handwriting (including foreign language characters), and drawings.

With all the benefits of facsimile data transmission, there are instances where the facsimile mode of data input is not the most practical. For example, a busy executive wishing to send a brief message to another executive does not wish to have to prepare the message on a sheet of paper that can be input to the FAX machine and then transport the paper to the FAX machine for transmission. In most offices, there is only one FAX machine for the whole office. In larger companies, there may be a FAX machine for each group or department. In any event, it is unlikely that the busy executive has direct and easy access to the machine required to transmit his message. Where available, so-called "electronic mail" (a variation of the arrangement of FIG. 2 with a plurality of computers tied together over a network) can be used for the purpose. Unfortunately, very few organizations have electronic mail for their employees. This is typically limited to, for example, manufacturers of computer systems which have a large internal computer network which will support electronic mail as a peripheral benefit.

Military applications are another area of use where facsimile transmission can be of benefit; but, where the input mode of conventional facsimile devices is not always practical. For example, a forward observer could transmit data back to a command post over telephone lines (optic fiber being particularly useful in a battle field environment) using facsimile techniques; however, it would not be practical to carry the scanning input device or to prepare documents for scanning and transmission. The forward observer requires a device which can be "militarized" to take the abuse of use in a battlefield environment and a device which can take direct data input. Moreover, he needs something that is easy to use. A battlefield environment is not the time to try to remember complicated computer/device protocols. The objective is to get the data observed back to the command post so that action can be taken thereon.

A similar situation is associated with the placement of orders. In this regard, the term "placement of orders" can encompass many transactions. there is the outside salesperson transmitting orders for products sold back to the home office. There is the consumer wishing to place an order from a catalog, or the like. There is the person wishing to pay bills, etc., in which the creation and transmission of a credit voucher, check, or such, including a legally binding, authorizing signature is required. All these "order placers" have a common goal—they wish to transmit specialized data to a remote source. Moreover, they may be operating in an environment requiring a small, truly portable device (i.e. fits in a briefcase) which can be operated from a telephone booth or from the telephone in a hotel room. Most important, like the military forward observer, they do not want to have to learn a multitude of specialized protocols to perform their task. Current statistics indicate that most of the targets of their data transfer have facsimile devices. Thus, if they could transmit in facsimile format, their "order" could be printed out by the recipient's facsimile device to provide an instant hard copy of the order. On the other hand, contemporary facsimile devices (even so-called "portable" devices) are not practical for the areas of use being considered here.

Wherefore, it is an object of the present invention to provide an input device which will permit a user to input alpha-numeric data into a keyboard for direct transmission over the telephone lines to a facsimile device for printing thereby.

It is another object of the present invention to provide a device for inputting alpha-numeric data into a keyboard and transmitting it over the telephone lines to a facsimile device for printing thereby which is tutorial in nature whereby complicated protocols need not be learned or memorized.

It is still another object of the present invention to provide a device for inputting alpha-numeric data into a keyboard and transmitting it over the telephone lines to a facsimile device for printing thereby which includes the capability of inserting an authorizing signature into the document created.

It is a further object of the present invention to provide a device for inputting alpha-numeric data into a keyboard and transmitting it over the telephone lines to a facsimile device for printing thereby which is small, easily portable, and which can be used with any telephone.

It is yet a further object of the present invention to provide a device for inputting alpha-numeric data into a keyboard and transmitting it over the telephone lines to a facsimile device for printing thereby which can contain the definition of pre-established forms to be displayed for data insertion at appropriate points by a user.

It is still a further object of the present invention to provide a device for inputting alpha-numeric data into a keyboard and transmitting it over the telephone line to a facsimile device for printing thereby which can be produced in a version which is particularly suited for use by the military in battlefield environments.

Other objects and benefits of the present invention will become apparent from the description which follows hereinafter when taken in conjunction with the drawing figures that accompany it.

SUMMARY

The foregoing objects have been achieved in the keyboard to facsimile transmission device of the present invention comprising, input means for inputting a sequence of identifying signals representing alpha-numeric characters and delimiters comprising a message to be transmitted to a facsimile machine for printing thereby; modem means for establishing a telephonic connection to the facsimile machine; and, transmit means for sequentiallyretrieving the stored signals, for using the signals to formulate lines of facsimile compatible data representing the alpha-numeric characters associated with the signals; and for transmitting the lines of facsimile compatible data to the facsimile machine.

In the preferred embodiment, the input means comprises a keyboard comprising a plurality of sensible and pressable keys, the keys comprising alpha-numeric character keys and delimiter keys, a sensible output from each key comprising a unique the signal associated with the key. Additionally the input means comprises, display means for displaying alpha-numeric characters associated with signals input at an input thereof; buffer means for storing the sequences of signals comprising a message; and, input logic means connected to the keyboard for determining the ones of the keys that have been pressed, for sequentially storing the signal associated therewith in the buffer means, and for sequentially outputting signals associated with the character keys to the input of the display means. The preferred input logic means includes means for editing the signals as input to the display means and stored in the buffer means.

The preferred embodiment also includes, page definition table means for defining the characteristics of a pseudo page to be transmitted by the keyboard to facsimile transmission device; and additionally, the transmit means includes means connected to the page definition table means for inserting leading and trailing areas with no characters therein in the lines of facsimile compatible data containing characters and for inserting lines containing no characters as necessary to create a pseudo page as the output of the facsimile machine as defined by the page definition table means.

Another feature of the preferred embodiment is form definition table means for defining the contents of a form to be transmitted by the keyboard to facsimile transmission device, the form comprising a sequence of alpha-numeric character and delimiter signals; wherein, the input means includes means for alternately inputting signals from the form definition table and then the keyboard. A preferred addition comprises switch means associated with respective ones of the forms for causing the associated one of the forms associated with the switch to be input by the input means when the switch is activated. For superior ease of use by home consumers, and the like, the modem means includes means for operably connecting to a telephone line which can be connected to the facsimile machine by dialing a number associated with the facsimile machine; a telephone number is associated with each of the switch means; and, means are operably connected to the modem means for dialing the telephone number associated with the switch when it is activated prior to causing the associated one of the forms associated with the switch to be input by the input means.

In one embodiment of the forms mode, the input means stores the same signals in the buffer means as it outputs to the input of the display means whereby the completed form defined by the form definition table and user inputs to the keyboard is transmitted t the facsimile machine. In another embodiment of the forms mode, the input logic means stores spacing signals in the buffer means in place of the signals it outputs to the input of the display means whereby only characters from user inputs to the keyboard associated with the form defined by the form definition table properly spaced for insertion into a pre-printed form located at the facsimile machine as an output medium for printing thereon are transmitted to the facsimile machine.

For preferred use in creating documents such as checks, credit vouchers, and the like, there are means for inputting and storing a digitized hand drawing such as a signature and means included within the transmit means for including the digitized hand drawing within the lines of facsimile compatible data transmitted to the facsimile machine. The digitized darwing can be input by a bank, etc., at a remote location or via a small digitizing pad included within the device. Optionally, a PIN number can be stored and verified before allowing the transmission of the digitized signature.

Optional features include printing means operably connected to the transmit means for printing a hard copy of the characters and delimiters comprising the lines of facsimile compatible data transmitted to the facsimile machine, font definition means for defining each of the alpha-numeric characters as a grid of lines and columns of pixels, and pixel replication on a horizontal and vertical basis to reduce space and time constraints on the device.

DESCRIPTION OF THE DRAWINGS

FIGS. 22(a) through FIG. 22(i) depict the contents of the alpha-numeric fax line buffer of the present invention during a sequence of transmitting the word CAT.

DESCRIPTION OF THE PREFERRED AND VARIOUS EMBODIMENTS

The present invention in its basic form is shown functionally in FIG. 4 where it is represented by the dashed box 28. The keyboard to facsimile tansmission device of the present invention has been associated with the trademark Key-FAX by the inventors hereof and, therefore, in the interest of simplicity of terms, will be referred to hereinafter as the Key-FAX device. The Key-FAX device 28 has an alpha-numeric keyboard 14 for the manual inputting of data. While a conventional keyboard containing the English alphabet and associated characters along with the numbers 0–9 is depicted herein, in some applications (particularly military), it may be more advantageous to replace the conventional keyboard with a specialized keyboard whereby special characters of specialized meaning can be input. In such case, those skilled in the art will recognize and appreciate that the "font definitions" referred to later herein would have to be modified accordingly to define each of the special characters. Additionally, other types of devices may be desired in addition to or as a replacement for the keyboard 14. Again, this could be of particular interest in military applications where, for example, information could be read directly from a map by a barcode reader wand, or the like. Magnetic strip readers could be useful for credit voucher creation. An optical smart card such as that described in co-pending application Ser. No. 113,899, filed 129 Oct. 1987 and entitled LIGHT MODULATING SMART CARD by Donald A. Streck could also be used to benefit for inputting various data, particularly in military applications.

Figure 5:
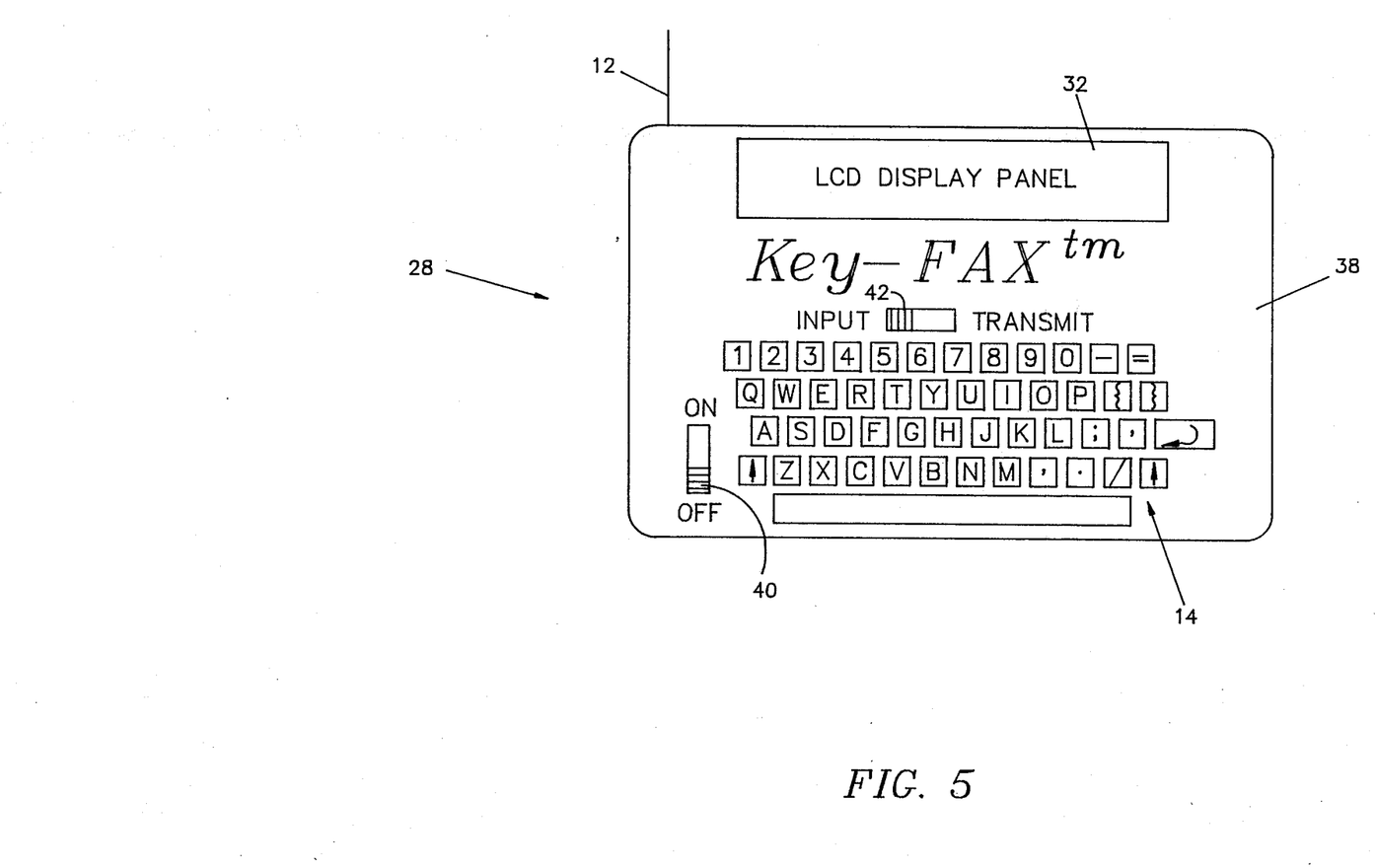
FIG. 5 is a plan view drawing of a basic keyboard to facsimile transmission system according to the present invention.

The input from the keyboard 14 is read by input and edit logic 30 in an editing mode; that is, it can be corrected as input. In the process of inputting the data, the input and edit logic 30 performs two functions—it displays the data on an LCD display panel 32 for viewing by the user and stores the data sequentially in a buffer 34. At transmission time, the data is removed from the buffer 34 by transmit logic 36 which formats it on a line-by-line basis to create a pseudo page of facsimile data which is transmitted over the telephone line 12 to the receiving FAX machine 24. The Key-FAX device 28 is shown in a basic form in FIG. 5. This, of course, in only one possible way that the device can be implemented and should not be considered as limiting in any way. In many ways the Key-FAX device 28 is similar to another communications device of the inventors hereof as described in detail in co-pending application Ser. No. 216,505, filed 8 July 1988 and entitled UNIVERSAL INFORMATION INTERCHANGE INTERFACE UNIT—particularly with respect to the inputting and editing of alpha-numeric data and the incorporation of other devices providing alpha-numeric data inputs. For the providing of such information as applicable to the present invention, the teachings of the foregoing co-pending applications are incorporated herein by reference. As shown in FIG. 5, the basic Key-FAX device 28 comprises a case 38 containing the components being described. There is, preferably, a multi-line, LCD display panel 32. The keyboard 14 is incorporated into the case 38 for convenience. There is an OFF-ON switch 40 to control the power, which can be from a wall outlet for home base use or from batteries, solar cells, or the like, for portable use. The various methods and apparatus for supplying power are known to those skilled in art and/or described in the above-referenced co-pending patent applications and, therefore, will not be addressed in any detail herein. There is a switch 42 for switching between the input (editing) mode and the transmit mode. The Key-FAX device 28 is shown conneced directly to the telephone line 12. This could also be accomplished through acoustic coupling, or the like, to a standard telephone handset for use in a portable embodiment with public telephones, cellular telephones, etc. Both these aspects are discussed in detail in the above-referenced co-pending patent applications and, therefore, are not to be addressed in any detail herein.

Figures 6, 7:
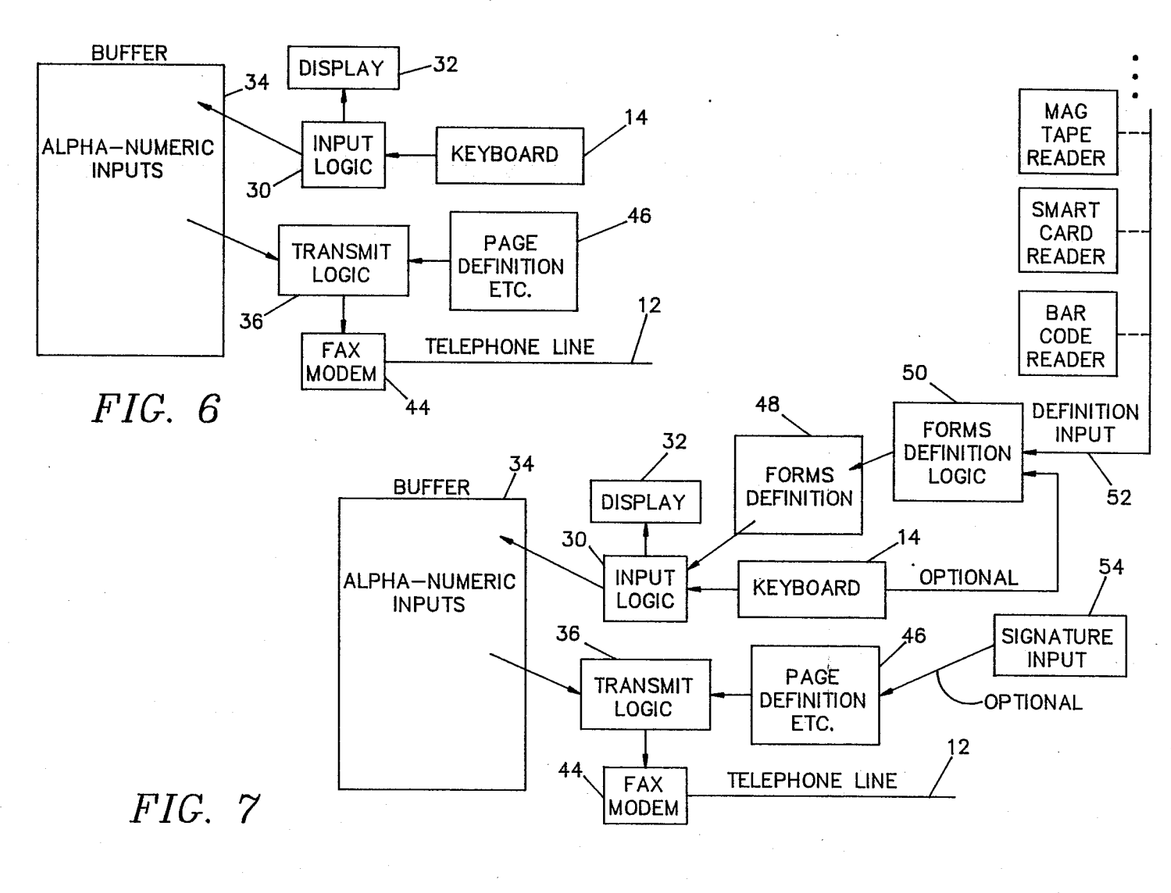
FIG. 6 is a functional block diagram depicting the manner of operation of the present invention in its basic embodiment without on-line forms generation.
FIG. 7 is a functional block diagram depicting the manner of operation of the present invention in an embodiment which includes on-line forms generation and provision for inputting an authorizing signature.

Turning now to FIGS. 6 and 7, the two modes of operation of the present invention which achieve the various objects thereof are shown in functional block diagram form. The basic mode as depicted in FIG. 6 is for the inputting and transmitting of alpha-numeric data only as input from the keyboard 14 (and/or other alpha-numeric input devices). As described earlier, the input and edit logic 30 reads the input from the keyboard 14 and displays it on the LCD display panel 32 as it simultaneously stores it into the buffer 34. The transmit logic 36 is connected to the telephone line 12 through a FAX modem 44, or equivalent, which provides the proper carrier interface with receiving facsimile equipment. The transmit logic 36 gets inputs from two sources. One is the alpha-numeric data stream of characters and delimiters (e.g. carriage returns) from the buffer 34. The other is page definition information as contained in the page definition table 46. Since the Key-FAX device 28 is not scanning a document as in normal facsimile equipment, the pseudo page it is to create must be defined. Thus, the page definition table 46 contains page size (typically 8.5 by 11 inches) and margin size (typically one inch on top and bottom and the two sides). This information can be made permanent or changeable through the keyboard 14, as desired.

The mode of operation as depicted in FIG. 7 includes the provision for predefined forms inclusion and signature input. As with the basic embodiment, there is input and edit logic 30 which inputs from the keyboard 14 and outputs to the LCD display panel 32 and buffer 34. Additionally, however, the input and edit logic 30 gets an input stream from the forms definition table 48. The forms definition table 48 contains pre-defined alpha-numeric character strings and delimiters (e.g.":"). These are accessed first by the input and edit logic 30 when the Key-FAX device 28 is inputting data in the forms mode. The character strings from the table 48 are input, displayed and stored in the buffer 34 just as if they had been input from the keyboard 14. When a delimiter if found, the input and edit logic 30 stops and switches to the keyboard 14 for its next inputs. This continues until a delimiter is input to the keyboard 14. The logic 30 then switches back to the table 48 for its next inputs. Thus, the inputting sequence becomes totally tutorial to the user. For example, the form definition inputs NAME:.. The message NAME: thus appears on the LCD display 32 awaiting the user to type in the requested information, e.g., JOHN DOE. This interactive inputting from the table 48 and the keyboard 14 provides a device which affords the user with a virtually non-existent learning curve. With special keys and special characters, even an illiterate user could transmit information back from a remote site in, for example, the military situation. A small picture (made up of one or more special characters) of a tank followed by ? could request the observer to indicate yes or no by the pushing of the green or red key on the keyboard, respectively.

It should be noted at this point that the forms mode of the present invention can operate in two ways. In the form definition from the table 48 is displayed and stored in the buffer 34, as described above, the full form will be generated at the sending Key-FAX device 28. Alternately, the Key-FAX device 28 could be used to fill in the blanks on a pre-printed form at the receiving end. In such case, of course, the receiving FAX machine 24 would have to be of the type which prints by a photocopy process on cut sheet paper (containing the form with blanks to be filled in) rather than of the type which prints by a thermal process on special roll paper. To fill in the blanks, the contents of the forms definition table 48 would be displayed on the LCD display 32 to prompt the user as to the data to be entered. Rather than storing the prompt "NAME:" in the buffer 32, however, the input and edit logic 30 would store spaces so that the input name "JOHN DOE" would be spaced to be printed in the space after NAME: on the preprinted form.

As depicted in FIG. 7, the forms definition table 48 can be initialized in several ways. For one, it could be contained in read only memory (ROM) set up at the time of manufacture. This approach would be particularly applicable to military applications, for example. It could also be contained in programmable read only memory (PROM). This would be a good approach for devices which are to be customized (by the device retailer having the necessary PROM programming apparatus) for use by a particular business. Multiple devices could have customized forms input for use by their users when interfacing with the supplying company. The table could also be input to random access memory (RAM). This would be particularly applicable for users who wish to make their own custom forms. Such storage would, of course, be subject to erasure and, therefore, pre-stored sources of the programming data would be desirable. The process of setting up the table 48 is generally indicated in FIG. 7 by the block labelled forms definition logic 50 shown as inputting to the table 48. The logic 50 takes inputs from any source, as symbolized by the input line 52, and uses the data to set up the table 48. The inputs at line 52 could be, for example, magnetic tape, smart card, etc. Such devices could be included within the Key-FAX device 28 for the purpose, if desired. As indicated, for optional local input to the table 48, the keyboard 14 could be used, if desired.

As also depicted in FIG. 7, means for inputting a digitized signature, as symbolized by the signature input block 54, could also be included. One way would be to input the signature data from the block 54 to the page definition table 46. When a control character assigned thereto was input to the keyboard 14, it would cause the transmit logic 36 to transmit the signature block when encountered at transmit time. In this regard, the term "signature" could, of course, include any small hand drawn material.

Figure 8:
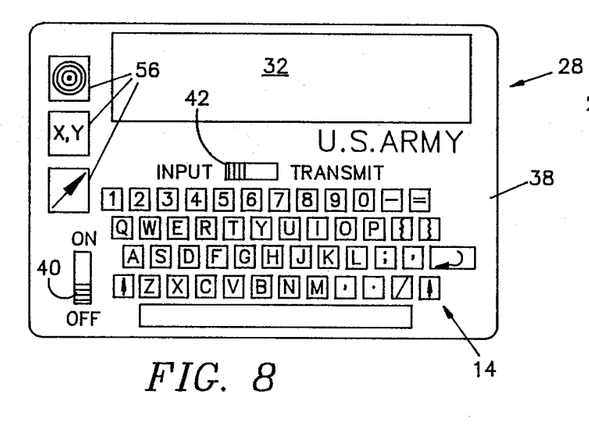
FIG. 8 is a plan view drawing of a keyboard to facsimile tansmission system according to the present invention as primarily intended for military field use with icon-selection of pre-established, forms-stimulated inputting of data.
Figure 9:
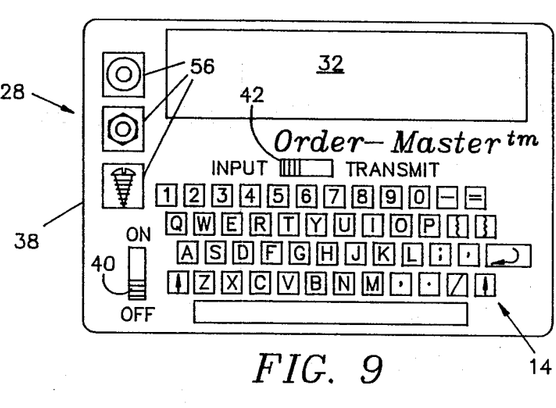
FIG. 9 is a plan view drawing of a keyboard to facsimile transmission system according to the present invention as primarily intended for use by outside salespersons, and the like, for transmitting orders to the home office with icon-selection of pre-established, forms-stimulated inputting of data.
Figure 10:
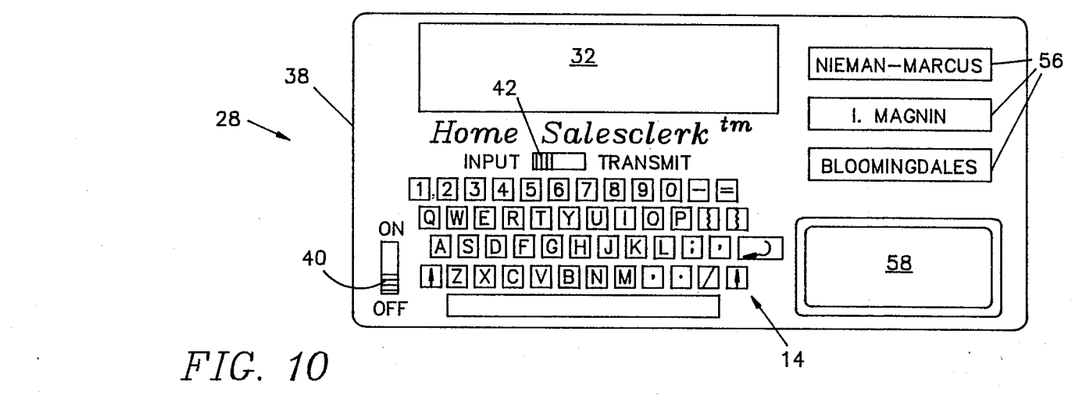
FIG. 10 is a plan view drawing of a keyboard to facsimile transmission system according to the present invention as primarily intended for use by home consumers, for transmitting orders to department stores, and the like, and generating checks, credit vouchers, etc. and including the capability of generating an authorizing signature block in the transmitted document.

Turning now to FIGS. 8-10, the present invention operating in the mode of FIG. 7 is shown as envisioned for several specific end-user applications. FIG. 8 represents a military device for use by the forward observer mentioned earlier herein. When the observer wishes to input data for transmission back to the command post, he merely presses one of the icon-labelled switches 56 to cause the appropriate one of several pre-stored forms definitions within table 48 to be input and prompt him through the input sequence. Pushing the "bullseye" switch 56, for example, could cause the entry and transmission of target data.

The Key-FAX device 28 of FIG. 9 is configured for use by an outside salesperson. As can be appreciated from a quick comparison, it is substantially identical to the military Key-FAX device 28 of FIG. 8. By simply changing the icons on the switches 56 and the forms defined in the table 48, the device now becomes one for placing orders for washers, nuts, and screws with the home office.

The Key-FAX device 28 of FIG. 10 is the most complete in the number of features and is intended primarily for the home consumer for paying bills, placing orders, and the like. By pressing the appropriate switch 56, the Key-FAX device 28 first dials the recipient's telephone number (as pre-stored as part of the form's definition process) and then executes the appropriate form for the transaction protocol. Thus, with a simple push of a button, a home shopper can place a call to Nieman-Marcus, for example, place an order, and provide a signed credit voucher for payment by signing in the signature pad 58 (to be discussed in greater detail shortly) provided for the purpose.

The ability to input verifying signatures into a document is an important aspect of the present invention. As those skilled in the banking and credit businesses are well aware, the inability to provide a signed document (i.e. a negotiable instrument), is a major problem with most remote credit transactions. While, on the one hand, ordering by telephone in response to writen, radio or television advertising is growing rapidly, on the other hand, the problems of remote credit transactions remain. As a result, many companies wishing to provide remote credit sales for their telephone customers find that the lending institutions (e.g. MasterCard, VISA, American Express, etc.) are either unwilling to provide them with the service or, alternatively, charge a large percentage as a "service charge" to cover the risk factors. The reasoning behind this is readily apparent. In a shop sale, the retailer calls the lender and has the sale "approved" before completing it. If the sale is approved, the customer's credit card is used to imprint the credit voucher with the basic information and, additionally, the customer signs the voucher. There can be no denying that the customer was involved in the transaction. By contrast, in a telephone sale, the credit card information is given verbally. The same "approval" by the lender is obtained; however, this really proves nothing except that the sale is within the account limit and that the credit card has not been reported as stolen. The voucher is then submitted to the lender unsigned. If the sale goes through and the customer pays the bill (as most do), there is no problem. If the customer wishes to deny having made the transaction (as an unfortunate number apparently do for one reason or the other), there is no way for the lender to press the issue. The lender has nothing to prove that the customer actually placed the order and authorized the credit transaction. It is the customer's word against the retailer's.

Figure 11:
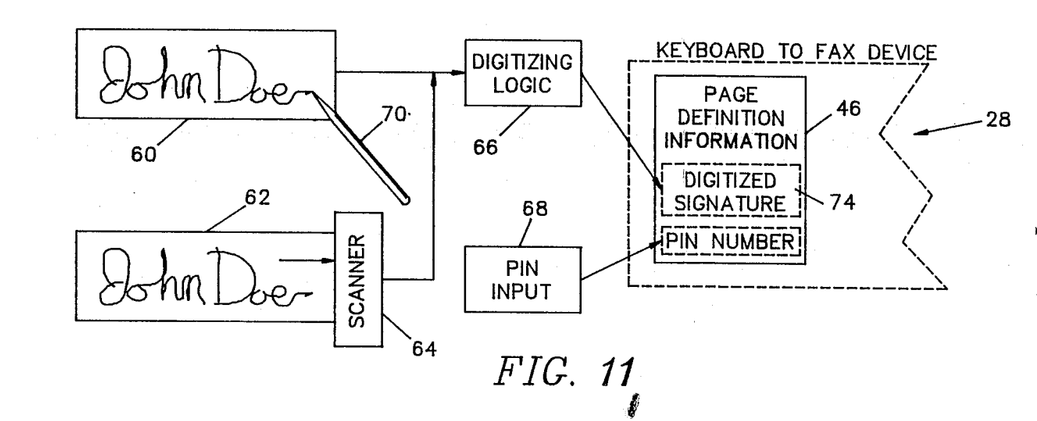
FIG. 11 is a simplified functional block diagram showing one manner of implementing the generation of an authorizing signature block in a transmitted document.
Figure 12:
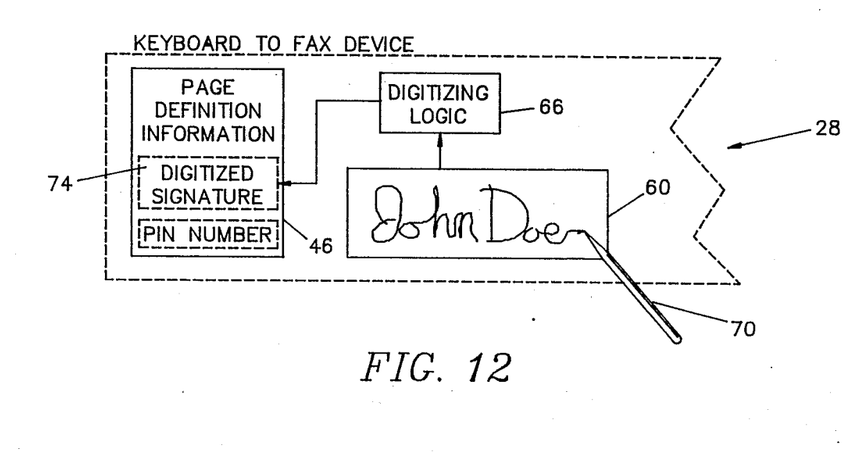
FIG. 12 is a simplified functional block diagram showing another manner of implementing the generation of an authorizing signature block in a transmitted document.
Figure 13:
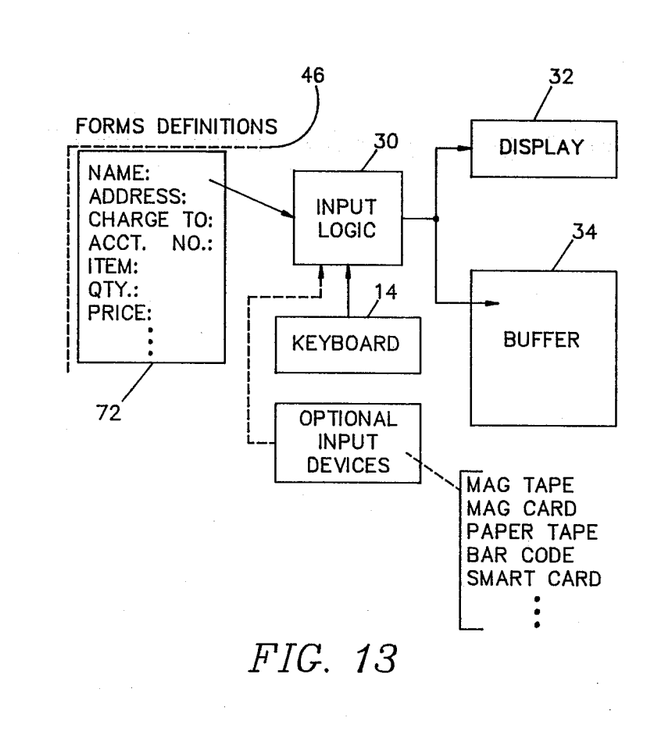
FIG. 13 is a simplified functional block diagram showing how the forms-stimulated inputting of data employed in the present invention operates.

In the present invention, an authorizing signature for use with the creation of negotiable checks, credit vouchers, legal documents, etc. can be provided for in two ways as shown in FIGS. 11 and 12—indirectly and directly. As shown in FIG. 11, the customer could go to the bank, or the like, to have his/her signature entered into the system in the same way that a customer provides a signature card at a bank to provide evidence of the customer's legal signature to be associated with documents and accounts serviced by the institution. One way to accomplish the procedure (others being apparent to those skilled in the art) would be to have the customer sign direcly on a digitizing pad 60 or have the customer's signature as signed on a strip of paper 62 read by an optical scanner 64 (of the type used in facsimile input scanning, for example). The output from the pad 60 or scanner 64 could be read by digitizing logic 66 and then output in a digitized form (ready for transmission as part of a facsimile document) into the page definition table 46 of the Key-FAX device 28. Simultaneously, the digitized signature from the logic 66 could be stored in the bank's data base (like a signature card) for later use as proof of signing, if necessary. To prevent unauthorized use of the stored signature in this approach, it is preferred that a personal identification number (PIN) input device 68 be employed to store a PIN number in the table 46 as well. At input and transmission time, the logic of the Key-FAX device 28 would then request the user to input the PIN number through the keyboard 14 and verify it against the prestored PIN number in the table 46 before inserting the digitized signature into the document.

An alternate approach (and the preferred approach) is shown in FIG. 12. In this case, a small digitizing pad 60 is included as part of the Key-FAX device 28 as the signature pad 58 referred to earlier. The user's signature as input to the pad 60 is digitized by the logic 66 and stored in the table 46 forlater output as in the prior approach. The digitized signature could be stored on a permanent basis to be used in conjunction with a PIN number as input through the keyboard 14. It is preferred, however, that the signature be entered on a one-short basis; that is, entered for inclusion in a single document at the point of indication and then be erased. This would allow multiple users to execute documents from the same device and would assure that the signature was made by the user (and not disgorged by a person having obtained the PIN number, legally or illegally). When implementing this latter approach, the pad 60 is preferably of a simple and inexpensive type as is known in the art which typically employs a changing resistance to sense the position of the stylus 70 used to execute the signature. In such pads, a current is applied alternately across the resistance coating of the pad in first the X direction and then the Y direction. By comparing the voltage developed across the resistive coating between one edge and the point of electrical contact made by the stylus 70 to the voltage developed across the resistive coating between the other edge and the point of electrical contact made by the stylus 70, the position of the stylus in each direction can be established. A pad 60 of about one half inch by two inches is all that is required to provide the signature digitization capability desired.

Figure 14:
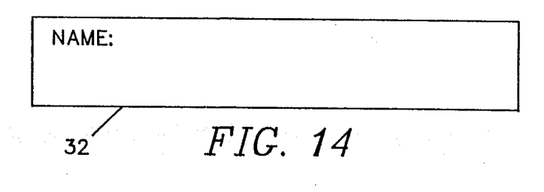
FIGS. 14–17 are drawings showing a sequence of displays as they would appear to the user when employing the forms-stimulated inputting of data of the present invention.
Figure 15:
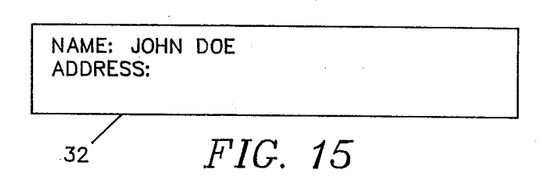
Figure 16:
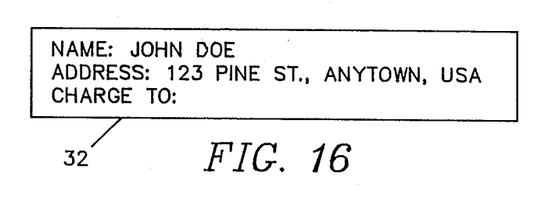
Figure 17:
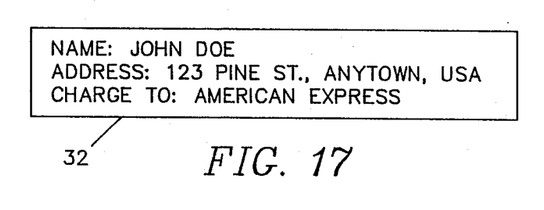

While mentioned and described briefly earlier herein, the operation of the Key-FAX device 28 in the forms mode is shown in further detail in FIGS. 13-17. A typical form definition 72 as used in making a credit order of merchandise might contain the prompting text shown in FIG. 13. When executed, a scrolling display of three lines employed for the LCD display panel 32 might then appear as shown in FIGS. 14-17. As shown in FIG. 14, the input and editing logic 30 first reads and displays the prompt NAME:. As shown in FIG. 15, the user input his name, JOHN DOE, from the keyboard 14, following which the logic 30 reads and displays the next line of the form, i.e. ADDRESS: Mr. Doe then inputs his address as 123 PINE ST., ANYTOWN, U.S.A. The logic 30 reads and displays CHARGE TO: as depicted in FIG. 16. The charge mode, i.e. AMERICAN EXPRESS, is then input by Mr. Doe as shown in FIG. 17 to complete the three lines of the display 32. When the logic 30 displays ACCT. NO.:, the address and charge to lines will move up on the display to lines one and two while the new line of text will appear at the bottom line. The inputting of the data in form 72 of the table 46 and keyboard 14 would then continue to the end of the form and transmission of the datain this scrolling mode of display and interaction.

Figure 18:
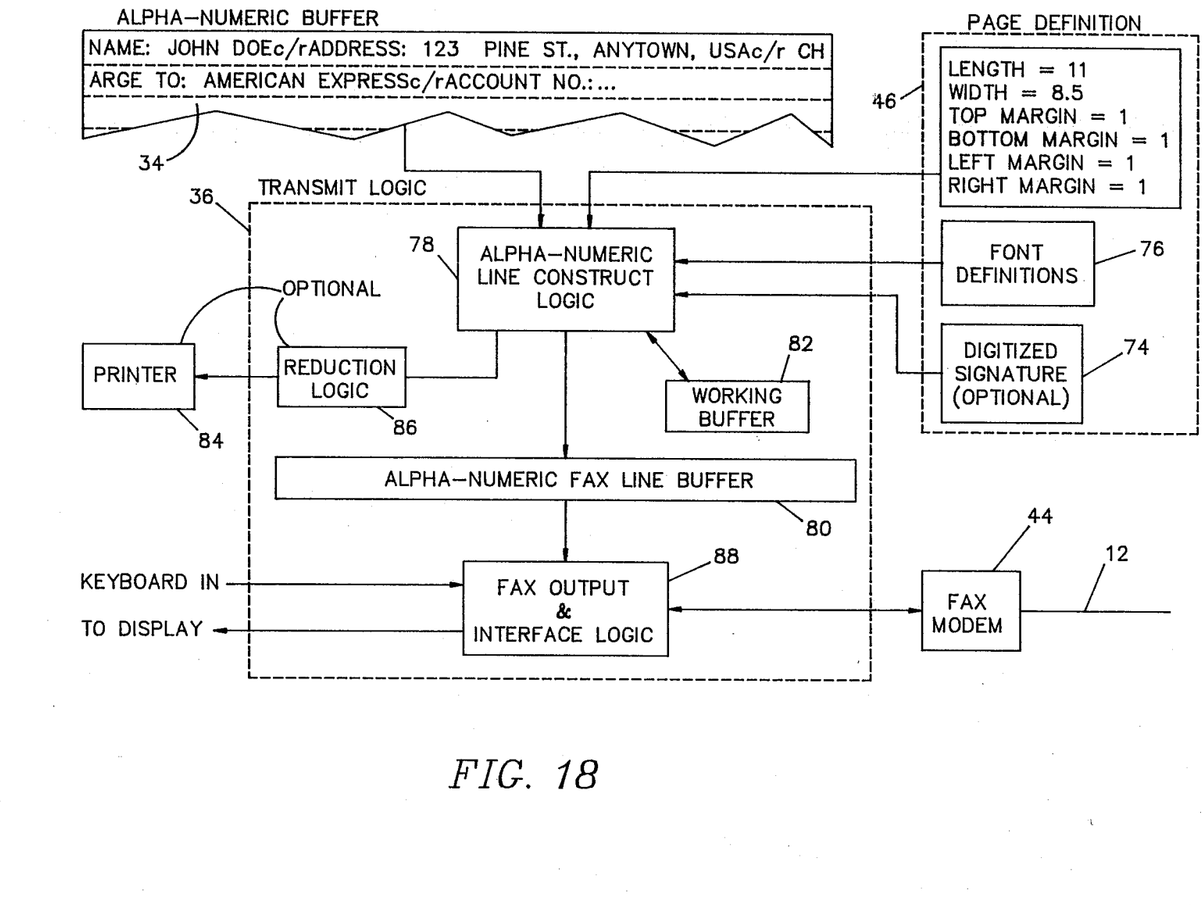
FIG. 18 is a simplified functional block diagram showing how the alpha-numeric data input from the keyboard and the forms definition is used to construct of virtual page of facsimile data for transmission to a facsimile device.

Referring now to FIG. 18, the manner of pseduo page construction and transmission as facsimile data according to the preferred embodiment of the present invention will now be addressed in greater detail. First, it is important to note that the present invention is not of the "virtual FAX" type known in the prior art. An approach known as display memory was first employed with computers for the generation of CRT displays and then later adapted for use with facsimile device because of their similarity of operationl, i.e. each is made up of a plurality of horizontal and vertical pixel positions (or dots) which can be represented in a binary manner. That is, each dot is either "on" or "off" representing light or dark on a CRT and black or white on a facsimile document. The document (display) is made up of a plurality of horizontal scan lines one pixel wide comprised of a plurality of adjacent pixels. Thus, the contents of the document (display) can be represented by a memory area containing the same number of binary bits as there are pixels in the document (display). In a computer, the contents of the display is constructed in the display memory and the display is created by outputting the contents of the display memory to the CRT on a bit per pixel basis. To change the display, the contents of the display memory are changed. At the next display refresh cycle, the new data is sued to refresh the display on the CRT, causing the new data to be displayed. Sometimes, duplicate display memories are provided so that the computer can manipulate one while the other is being used to drive the display. In like manner, many FAX machines now incorporate an analogous document memory. Data is first scanned into the document memory and then transmitted from the memory. Likewise, received documents have each page first read into the document memory and then print them from the memory. In a virtual FAX machine (typically implemented on a personal computer as an adjunct to the word processing program), the text as input is stored into a document memory in digitized form just as with any graphics program. It is then transmitted to the receiving computer by modem where it is read into a document memory and then output to a dot matrix or laser printer as graphics information. This is a PC to PC transfer of graphic data and not a true facsimile transmission. To the best of the applicant's knowledge, there is no virtual FAX programming and associated apparatus available in the art with will allow a PC to transmit graphics data to a FAX machine in a virtual FAX mode of operation. For one thing, the carrier frequencies employed in a computer modem and in a FAX modem kare different, and, therefore, incompatible. An important aspect of the present invention is that it is not a virtual FAX machine and, therefore, does not require the large (and costly) display/document memory required in such devices.

It is worthy of note at this point, if not appreciated from the description and drawings hereinbefore, that the present invention is an output only (i.e. transmit only) device. When placing an order, for example, any desired confirmatiom of the order's receipt and entry can be obtained from the recipient via a message sent to the transmitting telephone number of the order using the approach of the above-referenced co-pending application entitled UNIVERSAL INFORMATION INTERCHANGE INTERFACE UNIT. In this regard, the Key-FAX device 28 of this invention can be readily incorporated with the WORLD LINK TM alphanumeric communications link (ACL) described in that application with both devices sharing many components.

As shown in FIG. 18, the buffer 34 contains a contiguous sequence of alpha-numeric characters and control symbols as input from pre-defined forms from table 46, the keyboard 14, and any other input sources. It is not a display or document memory. Spaces, and the like, are preferably indicated symbolically by character codes to conserve space. Thus, if five spaces are input through the keyboard 14, a symbol for "spaces"=5 would be input to the buffer 34. As previously mentioned, the page definition table 46 contains the definition of the pseudo page to be constructed by the transmit logic 36 as well as the digitized signature 74, if present. It is preferred that the digitized signature 74 be provided on a higher resolution basis than the characters constructed by the transmit logic 36 according to the techniques to be described. In this regard, the digitized signature 74 is prefebly a pixel map of the half inch by two inch area of the document to be occupied by the signature. Since the generated characters in the preferred embodiment occupy approximately one eighth of an inch each, a signature 74 of that size would occupy approximately sixteen characters of width on approximately three text lines. The memory required for the digitized signature 74 at that size would be about 1250 bytes at a resolution of 100 dots per inch.

The page definition table 46 also includes a predefined font definition table 76 containing the definition of each of the fonts (characters and/or special symbols) to be used in constructing messages for output. This will be addressed in greater detail shortly.

The alpha-numeric input string from the buffer 34 and the page definition, font definitions, and optional digitized signature from the page definition table 46 are all input to the alpha-numeric line construct logic 78 contained within the transmit logic 36. The alpha-numeric line construct logic 78 uses this data to construct each line of facsimile data to be output in an alpha-numeric fax line buffer 80. The alpha-numeric line construct 78 is provided with a working buffer 82 into which text lines of characters can be constructed for subsequent transfer on a pixel line-by-pixel line basis to the line buffer 80. Assuming 200 dots per inch resolution of the receiving FAX machine and a standard 8.5 inch paper width with 0.5 inches non-printable on each side, the line buffer 80 need only be $(7.5 \times 200)/8$ bytes = 188 bytes in size. Likewise, the working buffer need only be 188 bytes times 27 (pixels per line) or 5076 bytes in size. This is a far cry from the $(200 \times 7.5 \times 200 \times 10)/8$ or 375,000 bytes needed for a full page virtual FAX machine's document memory.

In constructing each line of text for output, alpha-numeric line construct logic 78 interprets the data input to it in a manner which affects transmission (and subsequent printing) of a document page which physically represents what the data would have looked like if it had been typed on a standard page and was then input to a standard scanning FAX machine. For example, the top margin of one inch causes the alphanumeric line construct logic 78 to output 200 lines of "all white", i.e. no text. A carriage return causes the alpha-numeric line construct 78 to output approximately 13 lines of "all white" as the between text line clearance distance. This assumes one eighth inch high characters with one sixteenth inch between lines. These are arbitrary figures which can be modified at will for the particular implementation. For example, in an icon-oriented implementation employing many more complex "special characters", it may be desirable to make each "character" an inch in height.

The text to be output as formulated in the working buffer 82 may optionally be output locally for a record of the transmission by the alpha-numeric line construct logic 78 to a dot matrix printer 84, which may be included in the case of the Key-FAX device 28. In this regard, reference can be made to the above-referenced, co-pending application on the ACL for a description of the small dot matrix printers that may be employed. Additionally, optional reduction logic 86 may be inserted in the output from the alpha-numeric line construct logic 78 to the printer 84 to reduce the character size (and substitute a symbol for the signature 74) whereby to reduce the size of the printed record produced. Note, that the printed record produced by the printer 84 is not intended to be a copy of the document as printed out by the receiving FAX machine, but rather, a contiguous, packed, character string which merely provides a written record of the transmitted message.

Interface with the telephone line 12 (and, therefore, the receiving FAX machine) is affected by the FAX output and interface logic 88, which is also contained within the block generally termed the transmit logic 36. The FAX output and interface logic 88 has as one input the output from the line buffer 80. As another, it has the keyboard 14. The control of the FAX output and interface logic 88 by the user is preferably accomplished via inputs to the keyboard 14. While individual switches can be used if desired (and are to be considered within the scope and spirit of the present invention), it is preferred that, for example, transmission be started by depression of the T key on the keyboard in combination with another function-change key such as control (CTRL) key. Likewise, dialing of the recipient FAX machine could be initiated with a CTRL+D combination (for "dial"). If the Key-FAX device 28 is to be used to dial the receiving FAX machine (in lieu of parallel connection to a standard telephone or acoustic coupling thereto), the phone number can be input to the numeric characters on the keyboard 14. In such case, the FAX output and interface logic 88 would also need to include dialing generation logic of a type well known in the art and commercially available for incorporation into transmitting FAX machines. The FAX output and interface logic 88 also interfaces to the telephone line 12 through a standard FAX modem 44 and includes the associated interfacing logic of a type well known in the art and also commercially available for incorporation into transmitting FAX machines. Thus, in the interest of simplicity and the avoidance of redundancy, these aspects will not be addressed with any particularity. Sufficient to say, the FAX output and interface logic 88 includes the standard capability to receive a phone number from the keyboard 14 (or from storge in memory in response to the pressing of a switch 56 as in FIG. 10, for example), pick up the line, recognize a dial tone, dial the number, estalbish a handshake sequence with an answering FAX machine, and affect the intermediate signal transfers and recognitions necessary to transmit the "document" being constructed in the line buffer 80 and assure its successful completion. To this end, the FAX output and interface logic 88 is connected to output to the LCD display 32 for the displaying of messages to the operator during the transmission process, just as with most standard FAX machines today.

Figures 19, 20:
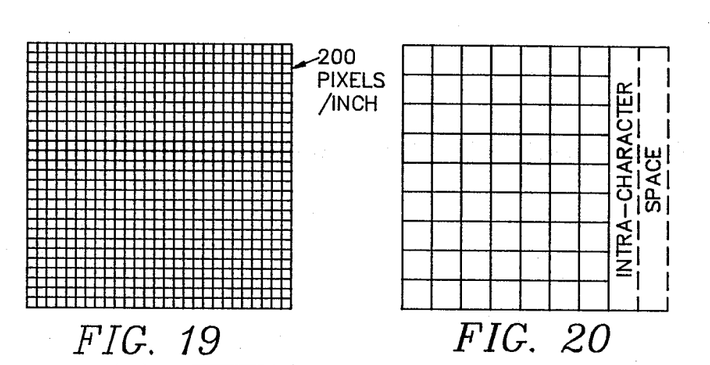
FIG. 19 is a drawing of a pixel grid representing the space occupied by one character and its adjacent space in one possible implementation of the present invention.
FIG. 20 is a drawing showing the pixel grid for character generation of FIG. 19 divided into areas of three adjacent pixel replication both vertically and horizontally in one possible implementation of the present invention.
Figure 21:
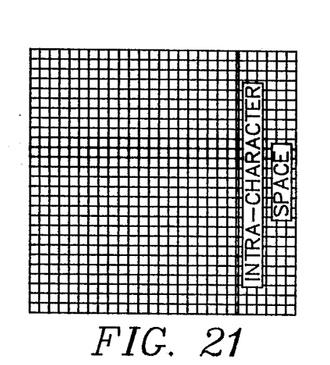
FIG. 21 shows the pixel grid of FIG. 19 divided according to the plan of FIG. 20.
Figure 22:
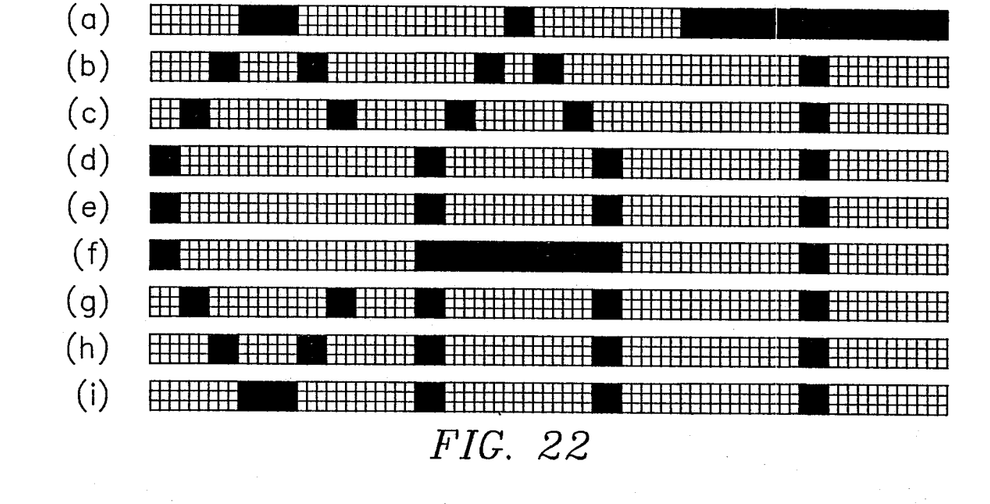

Turning now to FIGS. 19-22, the preferred method of character construction through pixel replication to reduce computational time and memory requirements will now be addressed. This portion of the present invention is intended to keep the cost of the Key-FAX device low for ease of availability for everyday use. Where memory requirements and computational power (with attendant higher costs) are not a problem or are secondary considerations, the present inventon can be implemented with the full resolution capability of the receiving FAX machines in mind. As depicted in FIG. 19 and as mentioned earlier, the Key-FAX device of the present invention was designed around a text size of approximately one eighth inch. In actuality, each character has a maximum height and width of 27 pixels in a 200 by 200 resolution environment. For reduction of space and time requirements, a 3 by 3 pixel replication scheme is envisioned. A 2 by 2 or 4 by 4 replication pattern could be employed if desired, for increased or reduced resolution by simply adjusting the figures being described. By employing the first 21 pixels for the character and the next 6 as the intra-character spacing as shown in FIG. 20 the basic pixel grid of FIG. 19 divided as shown in FIG. 21 can produce a 7 by 9 dot matrix pattern for each character. Each character in this scheme as it is stored in the font definition table 76 is defined in terms of the 7 by 9 dot matrix as a maximum size. Narrower letters, such as I and i are, of course, defined as narrower characters to prevent undue spacing between such characters. Likewise, the font chosen in the preferred embodiment is either a Helvetica or an OCR-A type of font such that the transmitted documents can be easily read by optical character recognition devices for ease of computer input on the receiving end without the necessity of retyping. FIGS. 22(a) through 22(b) depict the construction of a portion of a line of text according to the present invention in the process of outputting the word CAT. Each figure depicts the three replicated lines of pixels that would be output (one at a time) through the line buffer 80. Thus, the single line of identical pixels in FIG. 22(a) would be output three times. This would be followed by the single line of identical pixels in FIG. 22(b), which would be output three times, etc.

As a final point, it should be noted that when the digitized signature 74 (or small drawing affected in the same manner) is included, it is merged into or output as the entirety of the 100 lines (assuming 200 pixels per inch and a one half inch digitized signature) in which it appears in response to the specialized character which calls for its insertion. Since the digitized signature 74 (or drawing) is stored in a digitized form, its output within the pseudo page should be a straightforward matter. The manner of implementing this should be readily appaent to those skilled in the art and, therefore, it will not be addressed further herein.

Thus, it can be seen from the foregoing description and its accompanying drwings that the present invention has met all its stated objectives by providing a device which can simply and at low cost allow the inputting of alpha-numeric data for direct transmission to a facsimile device for printing thereby.

Wherefore, having thus described our invention, what is claimed is:

1. A keyboard to facsimile machine transmission device comprising:
   (a) a keyboard comprising a plurality of sensible and pressable keys, said keys comprising character keys and delimiter keys;
   (b) display means for displaying characters associated with character symbols inputted at an input thereof;
   (c) buffer means for storing sequences of symbols associated with said character and delimiter keys;
   (d) input logic means connected to said keyboard for determining the ones of said keys that have been pressed, for sequentially storing symbols associated therewith in said buffer means, and for sequentially outputting character symbols associated with said character keys to said input of said display means;
   (e) transmit logic means for establishing a telephonic connection to a facsimile machine, for sequentially retrieving said symbols stored in said buffer means, for using said character symbols are retrieved from said buffer means to formulate lines of facsimile compatible data representing said characters associated with said character symbols as retrieved from said buffer means; and for transmitting said lines of facsimile compatible data to said facsimile machine; and,
   (f) page definition table means for defining the characteristics of a pseudo page to be transmitted by the keyboard to facsimile transmission device; and wherein,
   (g) said transmit logic means includes means connected to said page definition table means for inserting leading and trailing areas without said characters therein in said lines of facsimile compatible data containing said characters and for inserting lines not containing said characters as necessary to create a pseudo page as the output of said facsimile machine as defined by said page definition table means.

2. The keyboard to facsimile machine transmission device of claim 1 and additionally comprising:
   (a) form definition table means for defining the contents of a form to be transmitted by the keyboard to facsimile machine transmission device, said form comprising a sequence of said character and delimiter symbols; and wherein additionally,
   (b) said input logic means includes means for alternately inputting symbols from said form definition table and then said keyboard.

3. The keyboard to facsimile machine transmission device of claim 2 wherein said form definition table means defines a plurality of forms and additionally comprising:
   switch means associated with respective ones of said forms for causing the associated one of said forms associated with a said switch to be inputted by said input logic means when said switch is activated.

4. The keyboard to facsimile machine transmission device of claim 3 and additionally comprising:
   (a) means for establishing a telephonic connection to a facsimile machine included in said transmit logic means including facsimile compatible modem means for operably connecting to a telephone line which can be connected to said facsimile machine by dialing a number associated with said facsimile machine;
   (b) a telephone number associated with each of said switch means; and,
   (c) means operably connected to said modem means for dialing said telephone number associated with a said switch when it is activated prior to causing the associated one of said forms associated with a said switch to be inputted by said input logic means.

5. The keyboard to facsimile machine transmission device of claim 2 wherein:
   said input logic means stores the same said symbols in said buffer means as it outputs to said input of said display means whereby the completed form defined by said form definition table and user inputs to said keyboard is transmitted to said facsimile machine.

6. The keyboard to facsimile machine transmission device of claim 2 wherein:
   said input logic means stores spacing symbols in said buffer means in place of the said symbols it outputs to said input of said display means whereby only characters from user inputs to said keyboard associated with the form defined by said form definition table properly spaced for insertion into a preprinted said form located at said facsimile machine as an output medium for printing thereon are transmitted to said facsimile machine.

7. The keyboard to facsimile machine transmission device of claim 1 and additionally comprising:
   (a) means for inputting and storing a digitized hand drawing; and, (b) means included within said transmit logic means for including said digitized hand drawing within said lines of facsimile compatible data transmitted to said facsimile machine.

8. The keyboard to facsimile machine transmission device of claim 7 wherein:
said means for inputting and storing a digitized hand drawing includes a digitizing pad upon which said hand drawing is drawn.

9. The keyboard to facsimile machine transmission device of claim 7 wherein:
said means for inputting and storing a digitized hand drawing includes a scanning device for optically scanning a material upon which said hand drawing is drawn.

10. The keyboard to facsimile machine transmission device of claim 1 wherein:
(a) said printing means is a dot matrix printing device; and additionally comprising,
(b) means operably connected to an input of said dot matrix printing device for receiving said characters and delimiters comprising said lines of facsimile compatible data and for reducing the size of said characters and delimiters before inputting them to said printing device whereby a reduced copy thereof is printed by said printing device.

11. The keyboard to facsimile machine transmission device of claim 1 and additionally comprising:
(a) means for inputting and storing a digitized hand drawing;
(b) means included within said transmit logic means for including said digitized hand drawing within said lines of facsimile compatible data transmitted to said facsimile machine; and,
(c) means for causing said printing means to substitute a symbol indicating the location of said digitized hand drawing for said digitized hand drawing in said hard copy.

12. The keyboard to facsimile machine transmission device of claim 1 and additionally comprising:
font definition means for defining each of said alpha-numeric characters as a grid of lines and columns of pixels.

13. The keyboard to facsimile machine transmission device of claim 12 wherein:
said font definition means defines each of said alpha-numeric characters as a dot matrix pattern of replicated horizontal and vertical pixels.

14. A character oriented pseudo facsimile transmission device comprising:
(a) input means for inputting and storing a sequence of identifying signals representing alpha-numeric characters and delimiters comprising a message to be transmitted to a facsimile machine for printing thereby;
(b) modem means for establishing a telephonic connection to a facsimile machine;
(c) transmit means for sequentially retrieving stored signals, for using said stored signals to formulate lines of facsimile compatible data representing the alpha-numeric characters associated with said stored signals; and for transmitting said lines of facsimile compatible data to said facsimile machine;
(d) a keyboard comprising a plurality of sensible and pressable keys, said keys comprising alpha-numeric character keys and delimiter keys, a sensible output from each said key comprising a unique signal associated with said key;
(e) display means for displaying alpha-numeric characters associated with signals inputted at an input thereof;
(f) buffer means for storing sequences of signals comprising a message;
(g) input logic means connected to said keyboard for determining the ones of said keys that have been pressed, for sequentially storing a signal associated therewith in said buffer means, and for sequentially outputting signals associated with said character keys to said input of said display means; and
(h) page definition table means for defining the characteristics of a pseudo page to be transmitted by the character oriented pseudo facsimile transmission device; and wherein additionally,
(i) said input logic means includes means for editing signals as inputted to said display means and stored in said buffer means; and,
(j) said transmit means includes means connected to said page definition table means for inserting leading and trailing areas without characters therein in said lines of facsimile compatible data containing characters and for inserting lines not containing characters as necessary to create a pseudo page as the output of said facsimile machine as defined by said page definition table means.

15. The character oriented pseudo facsimile transmission device of claim 14 and additionally comprising:
(a) form definition table means for defining the contents of a form to be transmitted by the character oriented pseudo facsimile transmission device, said form comprising a sequence of alpha-numeric character and delimiter signals; and wherein additionally,
(b) said input means includes means for alternately inputting signals from said form definition table and then said keyboard.

16. The character oriented pseudo facsimile transmission device of claim 15 wherein said form definition table means defines a plurality of forms and additionally comprising:
switch means associated with respective ones of said forms for causing the associated one of said forms associated with a said switch to be input by said input means when the said switch is activated.

17. The character oriented pseudo facsimile transmission device of claim 16 and additionally comprising:
(a) said modem means for establishing a telephonic connection to said facsimile machine includes means for operably connecting to a telephone line which can be connected to said facsimile machine by dialing a number associated with said facsimile machine;
(b) a telephone number associated with each of said switch means; and,
(c) means operably connected to said modem means for dialing the said telephone number associated with a said switch when it is activated prior to causing the associated one of said forms associated with a said switch to be input by said input means.

18. The character oriented pseudo facsimile transmission device of claim 15 wherein:
said input means stores the same said signals in said buffer means as it outputs to said input of said display means whereby the completed form defined by said form definition table and user inputs to said keyboard is transmitted to said facsimile machine.

19. The character oriented pseudo facsimile transmission device of claim 15 wherein:
said input logic means stores spacing signals in said buffer means in place of signals it outputs to said input of said display means whereby only characters from user inputs to said keyboard associated with the from defined by said form definition table properly spaced for insertion into a pre-printed form located at said facsimile machine as an output medium for printing thereon are transmitted to said facsimile machine.

20. The character oriented pseudo facsimile transmission device of claim 14 and additionally comprising:
(a) means for inputting and storing a digitized hand drawing; and,
(b) means included within said transmit means for including said digitized hand drawing within said lines of facsimile compatible data transmitted to said facsimile machine.

21. The character oriented pseudo facsimile transmission device of claim 20 wherein:
said means for inputting and storing a digitized hand drawing includes a digitizing pad upon which said hand drawing is drawn.

22. The character oriented pseudo facsimile transmission device of claim 20 wherein:
said means for inputting and storing a digitized hand drawing includes a scanning device for optically scanning a material upon which said hand drawing is drawn.

23. The character oriented pseudo facsimile transmission device of claim 14 and additionally comprising:
(a) dot matrix printing means operably connected to said transmit means for printing a hard copy of the characters and delimiters comprising said lines of facsimile compatible data transmitted to said facsimile machine; and,
(b) means operably connected to an input of said dot matrix printing means for receiving said characters and delimiters comprising said lines of facsimile compatible data and for reducing size of said characters and delimiters before inputting them to said printing means whereby a reduced copy thereof is printed by said printing device.

24. The character oriented pseudo facsimile tansmission device of claim 23 and additionally comprising:
(a) means for inputting and storing a digitized hand drawing;
(b) means included within said transmit means for including said digitized hand drawing within said lines of facsimile compatible data transmitted to said facsimile machine; and,
(c) means for causing said printing means to substitute a signal indicating the location of said digitized hand drawing for said digitized hand drawing in said hard copy.

25. The character oriented pseudo facsimile transmission device of claim 14 and additionally comprising:
font definition means for defining each of said alpha-numeric characters as a grid of lines and columns of pixels.

26. The character oriented pseudo facsimile transmission device of claim 25 wherein:
said font definition means defines each of said alpha-numeric characters as a dot matrix pattern of replicated horizontal and vertical pixels.

27. The method of inputting alpha-numeric messages to a keyboard and transmitting them directly to a facsimile machine for printing thereby comprising the steps of:
(a) providing a keyboard comprising a plurality of sensible and pressable keys for inputting messages, the keys comprising character keys and delimiter keys;
(b) providing a display for displaying characters associated with character symbols inputted at an input thereof;
(c) providing a buffer for storing sequences of symbols associated with the character and delimiter keys;
(d) inputting an alpha-numeric message into the keyboard and sequentially storing the symbols associated therewith in the buffer, sequentially outputting character symbols associated with the character keys to the input of the display, and editing the symbols as input to the display and stored in the buffer;
(e) establishing a telephonic connection to a facsimile machine;
(f) sequentially retrieving the symbols stored in the buffer;
(g) using the character symbols as retrieved from the buffer to formulate lines of facsimile compatible data representing the characters associated therewith;
(h) transmitting the lines of facsimile compatible data to the facsimile machine
(i) providing a page definition table defining the characteristics of a pseudo page to be transmitted to the facsimile machine;
(j) inserting leading and trailing areas with no characters therein in the lines of facsimile compatible data being transmitted containing characters; and,
(k) inserting lines containing no characters in the transmission as necessary to create the pseudo page as the output of the facsimile machine.

28. The method of claim 27 and additionally comprising the step of:
(a) providing a form definition table defining the contents of a form to be transmitted to the facsimile machine, the form comprising a sequence of character and delimiter symbols; and wherein,
(b) said step (d) thereof comprises alternately inputting symbols from the form definition table and then the keyboard.

29. The method of claim 28 wherein the form definition table defines a plurality of the forms and additionally comprising the steps of:
(a) providing a plurality of switches associated with respective ones of the forms; and,
(b) activating a desired one of the forms by activating the switch associated therewith.

30. The method of claim 29 and additionally comprising the steps of:
(a) associating a telephone number of a facsimile machine with each of the switches; and,
(b) dialing the telephone number associated with a switch when it is activated prior to causing the one of the forms associated with the switch to be input.

31. The method of claim 28 wherein:
step (d) thereof comprises storing the same symbols in the buffer as output to the input of the display whereby the completed form defined by the form definition table and user inputs to the keyboards is transmitted to the facsimile machine.

32. The method of claim 28 wherein:

step (d) thereof comprises storing spacing symbols in the buffer in place of the symbols it outputs to the input of the display whereby only characers from user inputs to the keyboard associated with the form defined by the form definition table properly spaced for insertion into a pre-printed form located at the facsimile machine as an output medium for printing thereon are transmitted to the facsimile machine.

33. The method of claim 27 and additionally comprising the steps of:
    (a) inputting and storing a digitized hand drawing; and,
    (b) including the digitized hand drawing within the lines of facsimile compatible data transmitted to the facsimile machine.

34. The method of claim 33 wherein said step (a) thereof comprises:
    (a) drawing the hand drawing on a digitizing pad; and,
    (b) digitizing and storing an output of the pad.

35. The method of claim 33 wherein said step (a) thereof comprises:
    (a) drawing the hand drawing on a medium;
    (b) optically scanning the medium with a scanning device;
    (c) digitizing and storing an output of the scanning device.

36. The method of claim 33 wherein the hand drawing is a signature and additionally comprising the steps of:
    (a) inputting and storing a personal identification number to be associated with the signature; and,
    (b) requesting the personal identification number be input to the keyboard and including the digitized signature within the lines of facsimile compatible data transmitted to the facsimile machine only if the proper personal identification number is input by a user.

37. The method of claim 27 and additionally comprising the steps of:
    (a) receiving the characters and delimiters comprising the lines of facsimile compatible data transmitted to the facsimile machine and reducing the size of the characters and delimiters; and,
    (b) printing a hard copy of the reduced size characters and delimiters whereby a reduced copy thereof is printed.

38. The method of claim 37 and additionally comprising the steps of:
    (a) printing the hard copy on a dot matrix printing device; and,
    (b) receiving the characters and delimiters comprising the lines of facsimile compatible data and reducing the size of the characters and delimiters before printing them whereby a reduced copy thereof is printed.

39. The method of claim 37 and additionally comprising:
    (a) inputting and storing a digitized hand drawing:
    (b) including the digitized hand drawing within the lines of facsimile compatible data transmitted to the facsimile machine; and,
    (c) substituting a symbol indicating the location of the digitized hand drawing for the digitized hand drawing in the hard copy.

40. The method of claim 27 and additionally comprising the steps of:
    (a) defining each of the alpha-numeric characters as a grid of lines and columns of pixels;
    (b) formulating a buffer of multiple lines of pixels comprising a single line of alpha-numeric characters;
    (c) sequentially transmitting respective ones of said line of pixels to a line output buffer; and,
    (d) outputting the contents of the line output buffer as the transmission to the facsimile machine.

41. The method of claim 40 wherein said steps thereof include:
    (a) defining each of the alpha-numeric characters as a dot matrix pattern of replicated horizontal and vertical pixels; and,
    (b) only transmitting a line of pixels to the line output buffer at the replication repeat rate when the contents of the line has changed.

* * * * *